United States Patent
Deng et al.

(10) Patent No.: US 10,704,355 B2
(45) Date of Patent: Jul. 7, 2020

(54) SLOTTED ANTI-EXTRUSION RING ASSEMBLY

(71) Applicant: Baker Hughes, a GE company, LLC, Houston, TX (US)

(72) Inventors: Guijun Deng, The Woodlands, TX (US); Andrew J. Cayson, Houston, TX (US); John K. Wakfield, Cypress, TX (US); Carlos A. Prieto, Katy, TX (US); Alexander M. Kendall, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 750 days.

(21) Appl. No.: 14/989,199

(22) Filed: Jan. 6, 2016

(65) Prior Publication Data

US 2017/0191340 A1 Jul. 6, 2017

(51) Int. Cl.
*E21B 33/12* (2006.01)
*E21B 33/128* (2006.01)
(Continued)

(52) U.S. Cl.
CPC ........ *E21B 33/128* (2013.01); *E21B 33/1216* (2013.01); *E21B 43/14* (2013.01); *E21B 43/26* (2013.01); *F16J 15/028* (2013.01)

(58) Field of Classification Search
CPC ....... F16J 15/166; F16J 15/028; E21B 33/128
See application file for complete search history.

(56) References Cited

U.S. PATENT DOCUMENTS

| | | | |
|---|---|---|---|
| 2,726,722 A | 12/1955 | Baker | |
| 2,767,795 A | 10/1956 | Bush | |

(Continued)

FOREIGN PATENT DOCUMENTS

| | | |
|---|---|---|
| AU | 2015397127 B2 | 12/2016 |
| EP | 1197632 A2 | 4/2002 |

(Continued)

OTHER PUBLICATIONS

Notification of Transmittal of the International Search Report and the Written Opinion of the International Searching Authority, or the Declaration; PCT/US2018/027359; dated Aug. 1, 2018; 11 pages.

(Continued)

*Primary Examiner* — Kristina R Fulton
*Assistant Examiner* — L. Susmitha Koneru
(74) *Attorney, Agent, or Firm* — Cantor Colburn LLP

(57) ABSTRACT

A sealing element is flanked by wedge-shaped extrusion ring assemblies. The extrusion rings are continuous for 360 degrees and are slotted from the outside dimension and alternatively from the inside dimension to allow the diameter to increase to the surround tubular or open hole. The extrusion rings climb a ramp on an adjacent pedestal ring on the way out to the borehole wall. Depending on the dimension of the gap to be spanned the extrusion ring slides a variable distance up the pedestal ring ramp. An optional anchor ring is initially forced up an opposite ramp of the pedestal ring. If the sealing gap is short the anchor ring can be eliminated. For larger gaps the anchor ring moves out far enough toward the borehole wall to contact the extrusion ring located on an opposing ramp of the pedestal ring so that reaction forces are directed to keep the anchor ring wedged in position for support of the extrusion ring assembly.

21 Claims, 6 Drawing Sheets

(51) Int. Cl.
*E21B 43/14* (2006.01)
*E21B 43/26* (2006.01)
*F16J 15/02* (2006.01)

(56) References Cited

U.S. PATENT DOCUMENTS

| | | | |
|---|---|---|---|
| 2,797,759 | A | 7/1957 | Long et al. |
| 2,885,009 | A | 5/1959 | Baker |
| 2,921,633 | A | 1/1960 | Baker |
| 2,945,541 | A | 7/1960 | Maly et al. |
| 3,229,767 | A | 1/1966 | Carter |
| 3,298,440 | A | 1/1967 | Current |
| 3,313,553 | A | 4/1967 | Gastineau |
| 3,343,607 | A | 9/1967 | Current |
| 3,358,766 | A | 12/1967 | Current |
| 3,381,969 | A | 5/1968 | Crow et al. |
| 3,385,679 | A | 5/1968 | Current |
| 3,481,611 | A | 12/1969 | Stratton |
| 3,960,311 | A | 6/1976 | Griffiths |
| 4,204,690 | A | 5/1980 | Arendt et al. |
| 4,349,204 | A | 9/1982 | Malone |
| RE31,933 | E | 7/1985 | Taylor et al. |
| 4,665,978 | A | 5/1987 | Luke |
| 4,753,444 | A | 6/1988 | Jackson et al. |
| 4,765,404 | A | 8/1988 | Bailey et al. |
| 4,852,394 | A | 8/1989 | Lazes |
| 4,892,144 | A | 1/1990 | Coone |
| 4,910,832 | A | 3/1990 | Schaub et al. |
| 5,027,894 | A | 7/1991 | Coone et al. |
| 5,161,806 | A | 11/1992 | Balsells |
| 5,311,938 | A | 5/1994 | Hendrickson et al. |
| 5,678,635 | A | 10/1997 | Dunlap et al. |
| 6,318,482 | B1 | 11/2001 | Fidtje |
| 6,431,274 | B1 | 7/2002 | Tedham et al. |
| 6,513,600 | B2 | 2/2003 | Ross |
| 6,581,682 | B1 | 6/2003 | Parent et al. |
| 6,598,672 | B2 | 7/2003 | Bell et al. |
| 7,124,826 | B2 | 10/2006 | Simpson |
| 7,178,601 | B2 | 2/2007 | Burge |
| 7,273,110 | B2 | 9/2007 | Pedersen et al. |
| 7,306,034 | B2 | 12/2007 | Garcia |
| 7,341,110 | B2 | 3/2008 | Doane et al. |
| 7,665,516 | B2 | 2/2010 | Roberts et al. |
| 7,708,080 | B2 | 5/2010 | Conaway et al. |
| 8,151,873 | B1 | 4/2012 | Lee et al. |
| 8,151,894 | B2 | 4/2012 | Nutley et al. |
| 8,205,671 | B1* | 6/2012 | Branton ............. E21B 33/134 166/118 |
| 8,276,678 | B2 | 10/2012 | Burnett et al. |
| 8,327,929 | B2 | 12/2012 | Reid et al. |
| 8,403,036 | B2 | 3/2013 | Neer et al. |
| 8,469,088 | B2 | 6/2013 | Shkurti et al. |
| 8,479,809 | B2 | 7/2013 | Farquhar |
| 8,662,161 | B2* | 3/2014 | Lee ................. E21B 33/1208 166/118 |
| 8,701,787 | B2 | 4/2014 | Shkurti et al. |
| 8,839,874 | B2 | 9/2014 | Bishop et al. |
| 9,140,094 | B2 | 9/2015 | Yee et al. |
| 9,587,458 | B2 | 3/2017 | Derby |
| 2002/0043368 | A1 | 4/2002 | Bell et al. |
| 2003/0037932 | A1 | 3/2003 | Guillory et al. |
| 2003/0226659 | A1 | 12/2003 | Smith et al. |
| 2004/0134659 | A1 | 7/2004 | Hoffman et al. |
| 2006/0289173 | A1 | 12/2006 | Conaway et al. |
| 2007/0125532 | A1 | 6/2007 | Murray et al. |
| 2007/0200299 | A1 | 8/2007 | Kunz |
| 2007/0256827 | A1 | 11/2007 | Guerrero et al. |
| 2007/0261863 | A1 | 11/2007 | MacLeod et al. |
| 2008/0041583 | A1 | 2/2008 | Angman et al. |
| 2008/0061510 | A1 | 3/2008 | Li et al. |
| 2008/0073074 | A1 | 3/2008 | Frazier |
| 2008/0190600 | A1 | 8/2008 | Shkurti et al. |
| 2009/0065191 | A1 | 3/2009 | Reid et al. |
| 2009/0159265 | A1 | 6/2009 | Freyer |
| 2009/0255690 | A1 | 10/2009 | Conner et al. |
| 2009/0277648 | A1 | 11/2009 | Nutley et al. |
| 2009/0283254 | A1 | 11/2009 | Andersen et al. |
| 2009/0308592 | A1 | 12/2009 | Mercer et al. |
| 2010/0038074 | A1 | 2/2010 | Patel |
| 2010/0186970 | A1 | 7/2010 | Burnett et al. |
| 2010/0276137 | A1 | 11/2010 | Nutley et al. |
| 2010/0294485 | A1 | 11/2010 | Lynde et al. |
| 2011/0101615 | A1 | 5/2011 | Clarke et al. |
| 2011/0297368 | A1 | 12/2011 | Lembcke |
| 2012/0018143 | A1 | 1/2012 | Lembcke |
| 2012/0037355 | A1 | 2/2012 | Bishop et al. |
| 2012/0073830 | A1 | 3/2012 | Lembcke et al. |
| 2012/0133098 | A1 | 5/2012 | Farquhar |
| 2012/0217025 | A1* | 8/2012 | Shkurti ............. E21B 33/1216 166/387 |
| 2012/0305236 | A1 | 12/2012 | Gouthaman |
| 2013/0147120 | A1 | 6/2013 | O'Malley |
| 2013/0213672 | A1 | 8/2013 | Nutley et al. |
| 2013/0306330 | A1* | 11/2013 | Bishop ............. E21B 33/1216 166/387 |
| 2013/0306331 | A1 | 11/2013 | Bishop et al. |
| 2014/0034335 | A1 | 2/2014 | Nutley et al. |
| 2014/0262351 | A1 | 9/2014 | Derby |
| 2014/0290946 | A1 | 10/2014 | Nguyen et al. |
| 2015/0308214 | A1 | 10/2015 | Bilansky et al. |
| 2015/0354313 | A1 | 12/2015 | McClinton et al. |
| 2016/0369586 | A1 | 12/2016 | Morehead et al. |
| 2017/0342797 | A1 | 11/2017 | Murphree et al. |
| 2018/0023366 | A1 | 1/2018 | Deng et al. |
| 2018/0298716 | A1 | 10/2018 | Cayson et al. |
| 2018/0298718 | A1 | 10/2018 | Cayson et al. |
| 2018/0320473 | A1 | 11/2018 | Xu et al. |
| 2019/0017347 | A1 | 1/2019 | Kendall et al. |
| 2019/0040710 | A1 | 2/2019 | Deng et al. |
| 2019/0078413 | A1 | 3/2019 | Kendall et al. |
| 2019/0120011 | A1 | 4/2019 | Kellner |
| 2019/0169951 | A1 | 6/2019 | Frazier |
| 2019/0249511 | A1 | 8/2019 | Deng et al. |
| 2019/0345791 | A1 | 11/2019 | Kendall et al. |
| 2019/0352997 | A1 | 11/2019 | Brown |
| 2019/0368304 | A1 | 12/2019 | Deng et al. |

FOREIGN PATENT DOCUMENTS

| | | |
|---|---|---|
| WO | 2006046075 A2 | 5/2006 |
| WO | 2006121340 A1 | 11/2006 |
| WO | 2009074785 A2 | 6/2009 |
| WO | 2013-128222 A1 | 9/2013 |

OTHER PUBLICATIONS

Notification of Transmittal of the International Search Report; PCT/US2018/050395; dated Jan. 2, 2019; 5 pages.
Notification of Transmittal of the International Search Report and the Written Opinion of the International Searching Authority, or the Declaration; PCT/US2018/041880; dated Nov. 21, 2018; 13 pages.

* cited by examiner

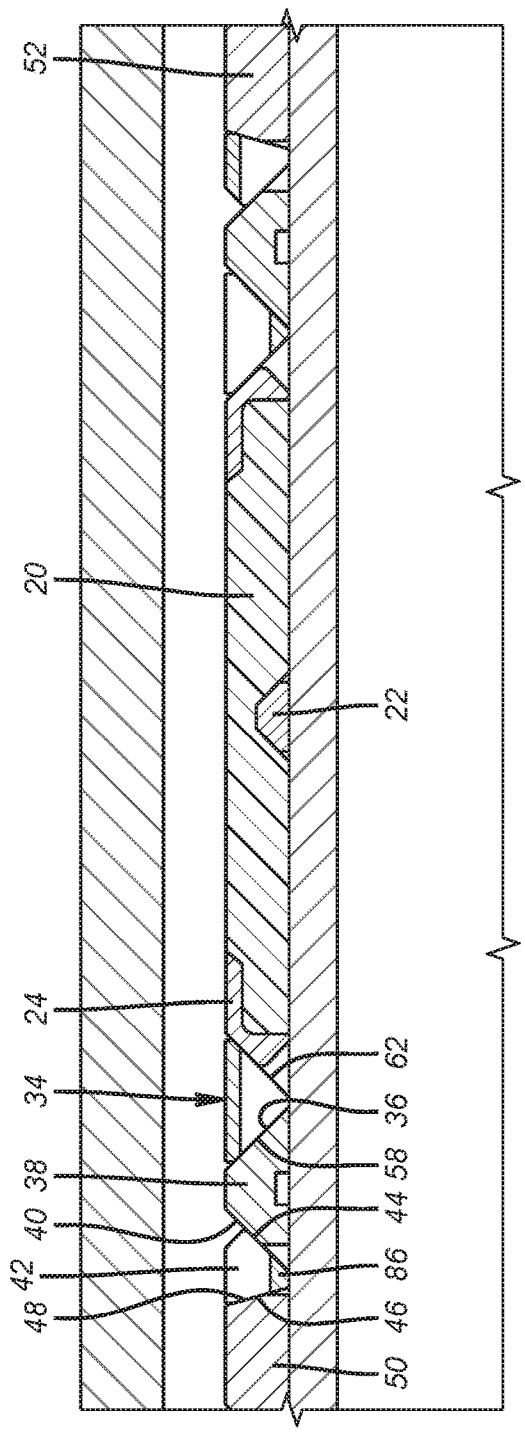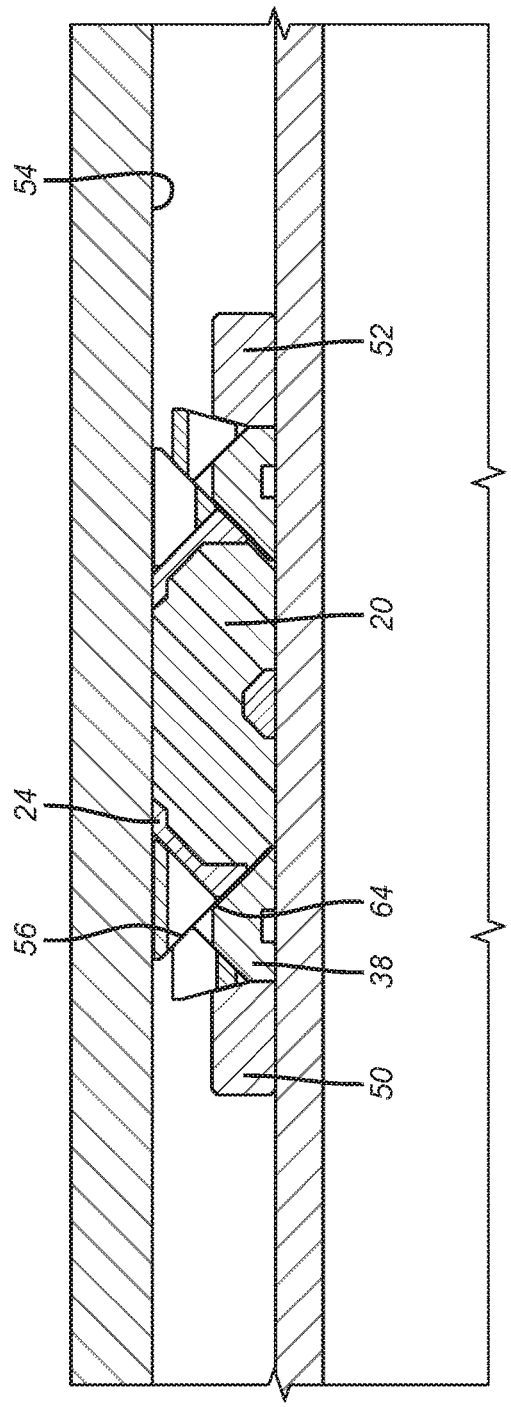

SLOTTED ANTI-EXTRUSION RING ASSEMBLY

FIELD OF THE INVENTION

The field of the invention is sealing systems for subterranean tools against tubular or open hole or cased hole and more particularly anti-extrusion barriers for low, medium and extended reach for a seal element.

BACKGROUND OF THE INVENTION

In the unconventional drilling and completion industry, oil and gas deposits are often produced from tight reservoir formations through the use of fracturing and frack packing methods. To frack a well involves the high pressure and high velocity introduction of water and particulate media, typically a sand or proppant, into the near wellbore to create flow paths or conduits for the trapped deposits to flow to surface, the sand or proppant holding the earthen conduits open. Often, wells have multiples of these production zones. Within each production zone it is often desirable to have multiple frack zones. For these operations, it is necessary to provide a seal known as a frack packer, between the outer surface of a tubular string and the surrounding casing or borehole wall, below the zone being fractured, to prevent the pumped fluid and proppant from travelling further down the borehole into other production zones. Therefore, there is a need for multiple packers to provide isolation both above and below the multiple frack zones.

A packer typically consists of a cylindrical elastomeric element that is compressed axially, or set, from one end or both by gages within a backup system that cause the elastomer to expand radially and form a seal in the annular space. Gages are compressed axially with various setting mechanisms, including mechanical tools from surface, hydraulic pistons, atmospheric chambers, etc. Setting typically requires a fixed end for the gages to push against. These fixed ends are often permanent features of a mandrel but can include a dynamic backup system. When compressed, the elastomeric seal has a tendency to extrude past the gages. Therefore, anti-extrusion backups have become common in the art. However, typical elastomeric seals maintain the tendency to extrude through even the smallest gaps in an anti-extrusion backup system.

In cased-hole applications, anchoring of compression set packers is a common feature in the completion architecture. Anchoring is provided by wedge-shaped slips with teeth that ride up ramps or cones and bite into the casing before a packer is set. These systems are not part of the backup system nor are they designed to provide anti-extrusion. Often they are used in the setting of the packer to center the assembly which lowers the amount of axial force needed to fully set the elastomer seal. Once set, anchoring systems are also useful for the life of the packer to provide a uniform extrusion gap, maintain location and help support the weight of a bottom-hole assembly in the case of coiled tubing frack jobs. Anchors also prevent tube movement in jointed strings resulting from the cooling of the string by the frack fluid. Movement of the packers can cause them to leak and lose seal.

In open-hole frack pack applications it is rarer for the packer to have anchoring mechanisms, as the anchor teeth create point load locations that can overstress the formation, causing localized flow paths around the packer through the near well-bore. However, without anchors, movement from the base pipe tubing can further energize the elastomeric seal. Energizing the seal from tube movement tends to overstress the near wellbore as well, leading to additional overstressing of the wellbore, allowing communication around the packer, loss of production, and potential loss of well control to surface. However, the art of anchoring has been reintroduced in new reservoirs in deep-water open-hole fracking operations. The current state of the art in open-hole frack pack operations requires a choice between losing sealing due to anchor contact induced fractures, packer movement, or over-energizing of the elastomeric element.

Extrusion barriers involving tapers to urge their movement to block an extrusion path for a sealing element have been in use for a long time as evidenced by U.S. Pat. No. 4,204,690. Some designs have employed tapered surfaces to urge the anti-extrusion ring into position by wedging them outwardly as in U.S. Pat. No. 6,598,672 or in some cases inwardly as in U.S. Pat. No. 8,701,787. Other designs simply wrap thin metal rings at the extremities of the sealing element that are designed to contact the surrounding tubular to create the anti-extrusion barrier. Some examples of these designs are U.S. Pat. Nos. 8,479,809; 7,708,080; US 2012/0018143 and US 2013/0147120. Of more general interest in the area of extrusion barriers are U.S. Pat. No. 9,140,094 and WO 2013/128222.

In some applications the gap across which the seal is expected to function is quite large placing such applications beyond the limits of the design in U.S. Pat. No. 6,598,672. There is a need for an extended reach design that can withstand the pressure differentials. The present invention addresses this need with a wedge shaped extrusion ring assembly that, depending on the gap to be spanned is pushed on opposing ramps along a pedestal ring for extended reach when contacted by an outer support ring. To fixate the extrusion ring in the extended position an outer support ring also moves into contact with the extrusion ring in its extended position on the pedestal ring. In the extended reach configuration of the extrusion ring, the backup ring moves part way toward the surrounding tubular or borehole. In shorter reach applications the extrusion ring can move out to the surrounding tubular or borehole wall on one side of the pedestal ring and the outer support ring is eliminated. The backup ring is wedged against the surrounding borehole wall to allow it to act as an anchor for the plug that has the sealing system. In the extended reach configuration the reaction forces from the extrusion ring are directed into the abutting backup ring and into the setting system so that the backup ring is prevented from being squeezed out of its wedged position against the pedestal ring. These and other aspects of the present invention will be more readily apparent to those skilled in the art from a review of the description of the preferred embodiment and the associated drawings while understanding that the full scope of the invention is to be found in the appended claims.

SUMMARY OF THE INVENTION

A sealing element is flanked by wedge-shaped extrusion ring assemblies. The extrusion rings are continuous for 360 degrees and are slotted from the outside dimension and alternatively from the inside dimension to allow the diameter to increase to the surround tubular or open hole. The extrusion rings climb a ramp on an adjacent pedestal ring on the way out to the borehole wall. Depending on the dimension of the gap to be spanned the extrusion ring slides a variable distance up the pedestal ring ramp. An optional anchor ring is initially forced up an opposite ramp of the pedestal ring. If the sealing gap is short the anchor ring can be eliminated. For larger gaps the anchor ring moves out far enough toward the borehole wall to contact the extrusion ring located on an opposing ramp of the pedestal ring so that reaction forces are directed to keep the anchor ring wedged in position for support of the extrusion ring assembly.

BRIEF DESCRIPTION OF THE DRAWINGS

FIG. 2 is a section view in the run in position for a long reach embodiment;

FIG. 3 is the view of FIG. 2 in the set position;

DETAILED DESCRIPTION OF THE PREFERRED EMBODIMENT

To appreciate the benefits of the present invention it is necessary to review the state of the art in compression set element extrusion barriers. The sealing element design is typically one or more rubber sleeves that are axially compressed against a surrounding tubular. Extrusion barriers can be one or more layers of flexible thin sheet located at an end of a sealing assembly. As the sealing element deforms due to axial compression the extrusion barrier rings such as item 64 in U.S. Pat. No. 5,311,938 bends with the end of sealing element and makes contact with the opposing wall to bridge the sealing gap with the idea that the rubber is prevented from extruding axially. While serviceable this design has issues in releasing which sometimes led to the packer getting stuck even when the sealing element extended and relaxed but the extrusion ring did not relax.

Figure 1B:
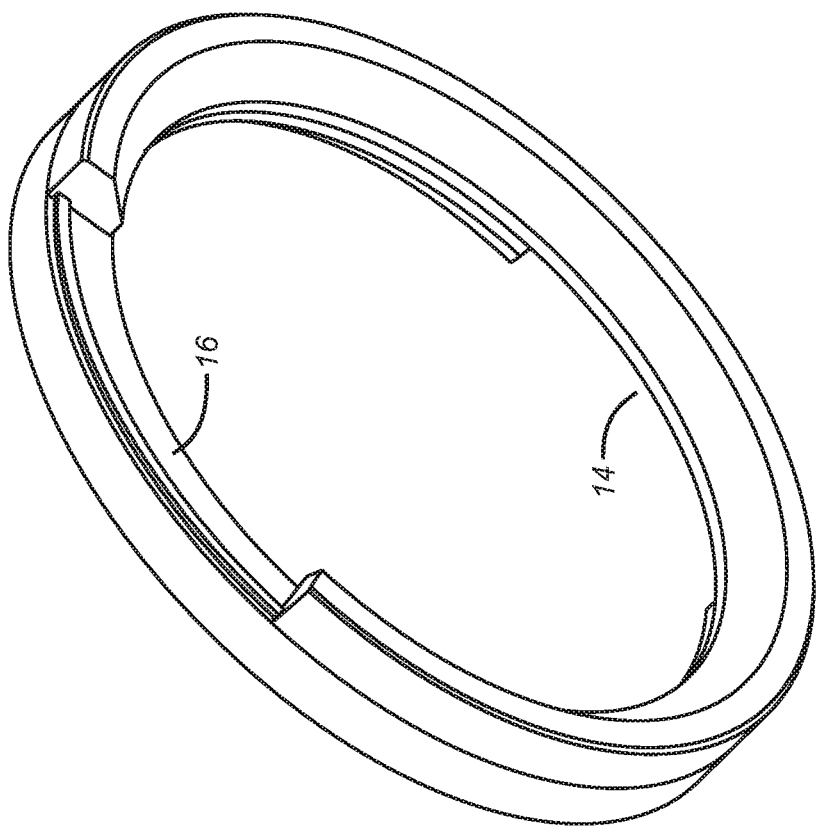
FIG. 1b is the view of FIG. 1a in the expanded condition showing the size increase for the split in the adjacent rings.
Figure 1A:
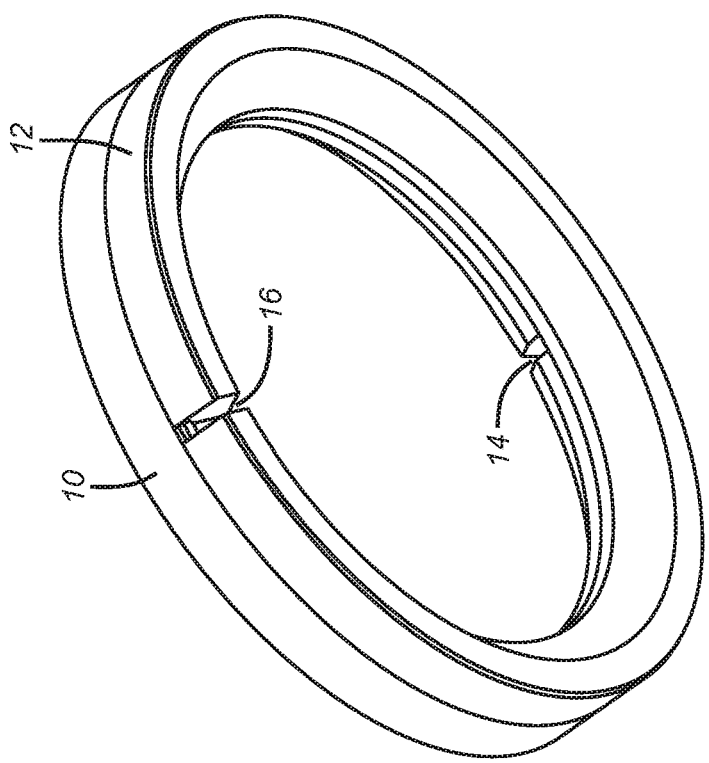
FIG. 1a is a prior art perspective view of split extrusion rings keyed together with splits opposed at 180 degrees shown in the run in condition.

FIG. 1a shows another extrusion barrier ring assembly using a pair of split rings 10 and 12 that have splits 14 and 16 respectively. The rings 10 and 12 are keyed to prevent relative rotation to keep the splits 14 and 16 spaced 180 degrees apart. When the sealing element is axially compressed these rings are moved out radially on a ring with a taper to contact the surrounding tubular as the gaps 14 and 16 get substantially larger. The enlarged gaps still created issues for rubber extrusion for the sealing element particularly in high pressure high temperature applications. With pressure differentials of over 10,000 PSI extrusion past assemblies shown in FIGS. 1a and 1b was still a significant concern.

The present invention addresses this concern in high temperature and high pressure applications by the creation and application of a 360 expandable ring design featuring alternating inner and outer radially oriented slits. For low and medium reach the expandable ring rides up a wedge ring until the surrounding tubular or the open hole borehole is contacted. In high reach application an outer expandable ring of a similar design rides on an opposite side of a wedge ring until forced into supporting contact of the principal expandable ring pushing the principal expandable ring against the surrounding borehole or tubular. The expandable rings can be made of Teflon or another flexible material that is sufficiently resilient while resistant to high temperatures and well fluids.

Figure 5:
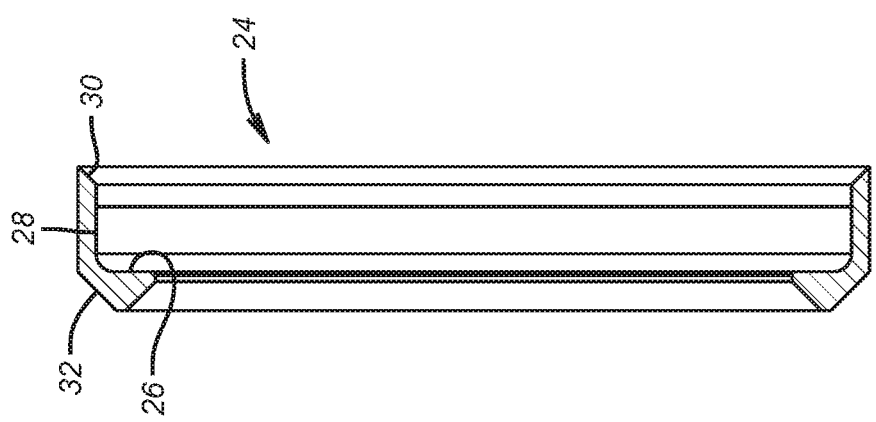
FIG. 5 is a side view of a backup ring that is located next to a sealing element.

FIG. 2 shows the basic layout for a long reach application. Sealing element 20 can optionally have a filler ring 22 in the center. The assemblies on opposed ends of the element 20 are preferably mirror image and so they will be described only for one side with the understanding that the opposed side is an identical mirror image. An extrusion barrier in the form of an expanding ring 24 is attached to the element 20 and is sufficiently flexible to move with it. FIG. 5 shows a section view of the bonded expanding ring 24. Ring 24 prevents the sealing element from escaping the cut slots of ring 34 and better conformability to the casing inside diameter or the borehole wall 54. It could be made of non-metallic material or very ductile metallic material.

Figure 8:
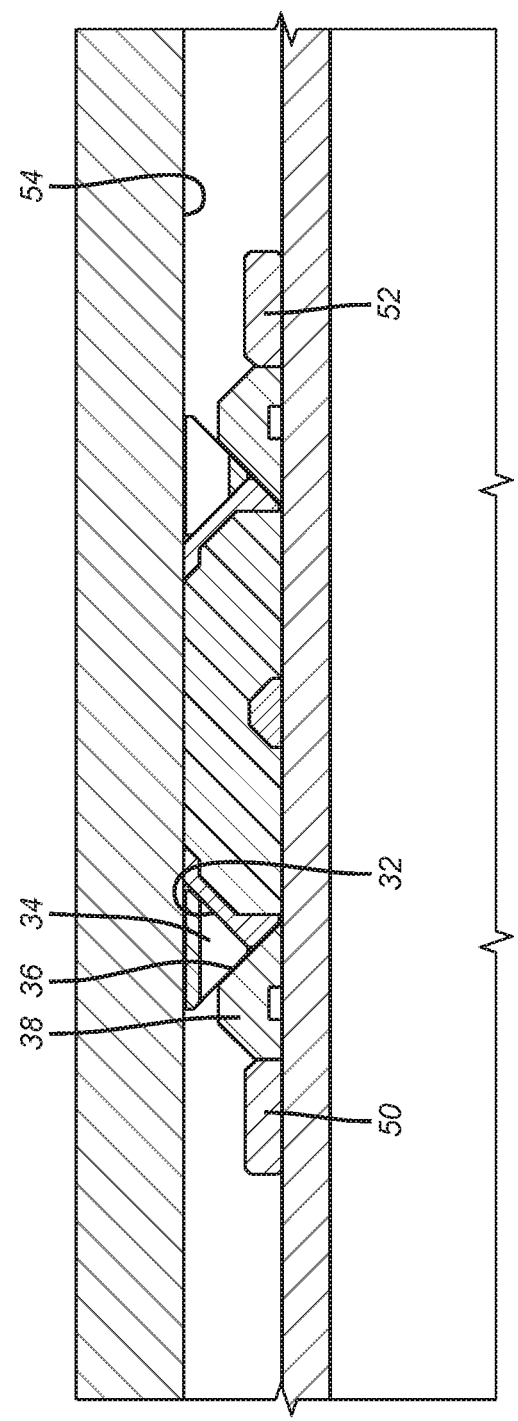
FIG. 8 is the view of FIG. 7 in the set position.
Figure 9:
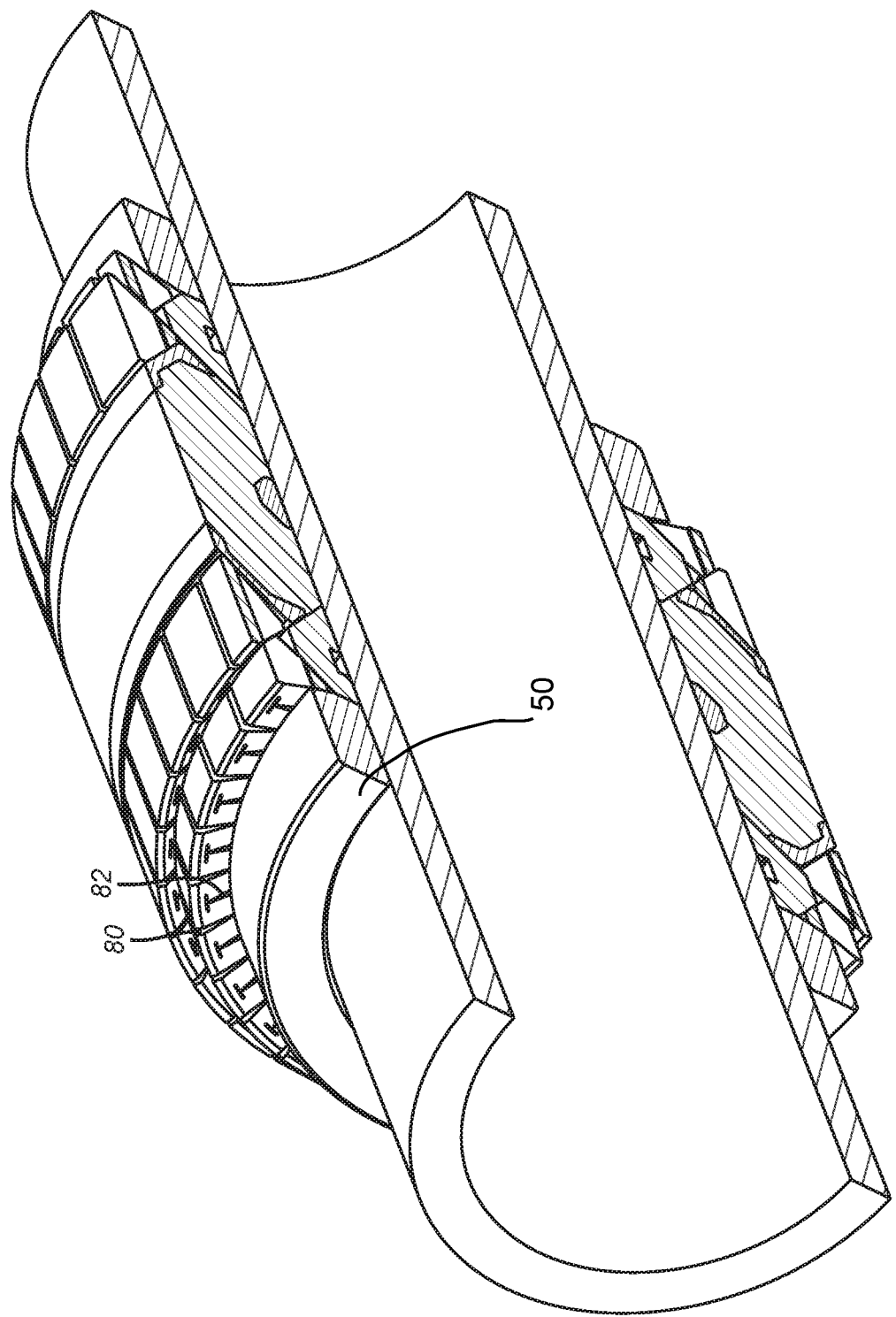
FIG. 9 is a perspective view of FIG. 3.

It has sides 26, 28 and 30 against seal 20 and a ramp surface 32. Inner expandable ring 34 rides on amp 32 on one side and ramp 36 of ramp ring 38. Ring 38 has another ramp 40 opposite ramp 36 on which rides outer expandable ring 42. Ramp 44 on outer expandable ring 42 rides on ramp 40 of ring 38. On the other side ramp 46 rides on ramp 48 of setting ring 50. The setting sequence results from relative movement between rings 50 and 52. Usually one is moving while the other is stationary. FIG. 3 shows the result of the relative movement. The element 20 is up against the borehole wall or surrounding tubular 54 as is the adjacent ring 24. Ring 38 has shifted toward element 20 by going under ring 24 that is continuously supported for 360 degrees by expandable ring 34. Inner expandable ring 34 has moved against the borehole wall or tubular 54 by sliding along opposed ramp surfaces 32 and 36. The outer expandable ring 42 has moved out on ramps 40 and 48 until its surface 56 engages surface 58 of inner expandable ring 34 to wedge it against the borehole wall or tubular 54. The new relative position of rings 50 and 52 can be releasably locked to hold the FIG. 3 set position until it is time to retrieve the packer. The abutting of rings 42 and 34 allows ring 34 to travel further out radially than in the FIG. $ embodiment which is otherwise the same except outer expandable ring 42 is not shown because the required radial movement in FIG. 8 is much less than in FIG. 3. As a result in FIG. 8 the inner expandable ring 34 simply rides out on ramps 36 and 32 until contact is made with the borehole wall or tubular 54. Ring 38 abuts ring 50 and does not go under ring 24 as in FIG. 3. The reach in FIG. 8 is much shorter than in FIG. 3.

Figure 4B:
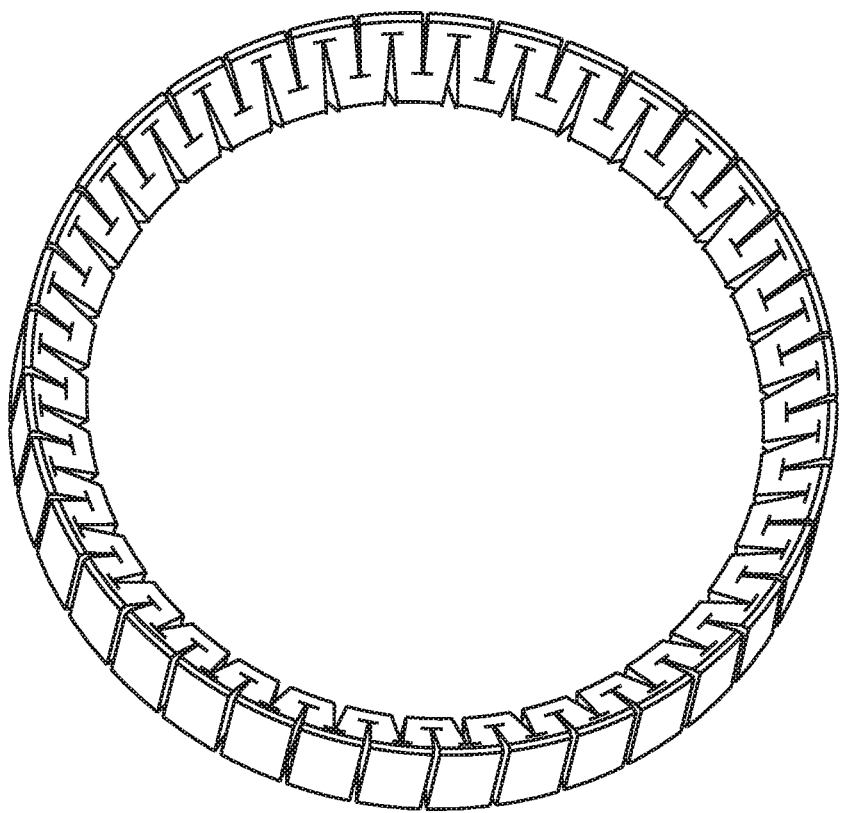
FIG. 4b is the view of FIG. 4a in the set position.
Figure 4A:
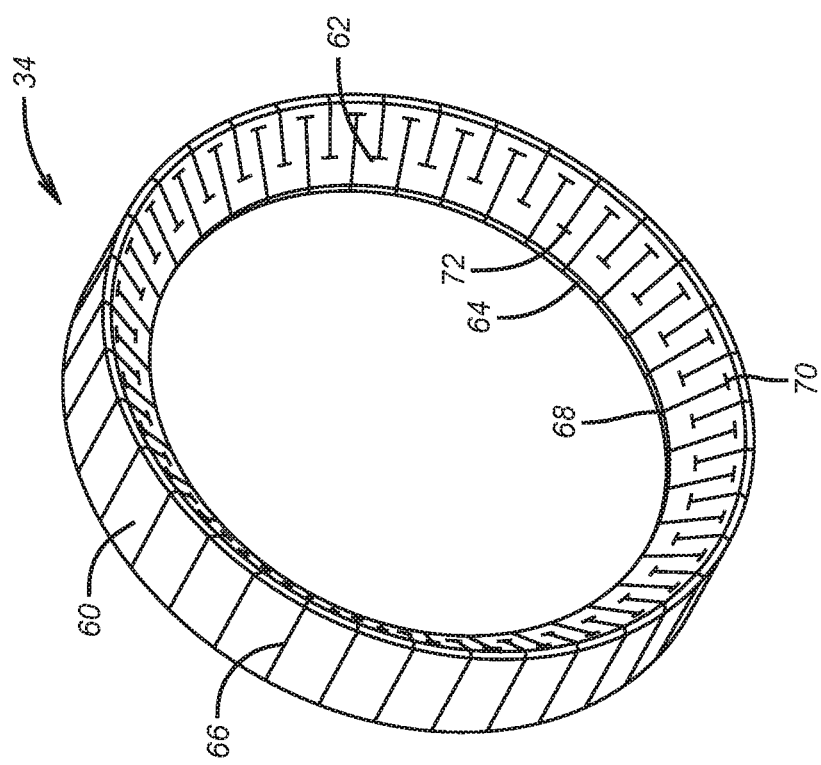
FIG. 4a is a perspective view of the extrusion ring in the run in position.
Figure 6:
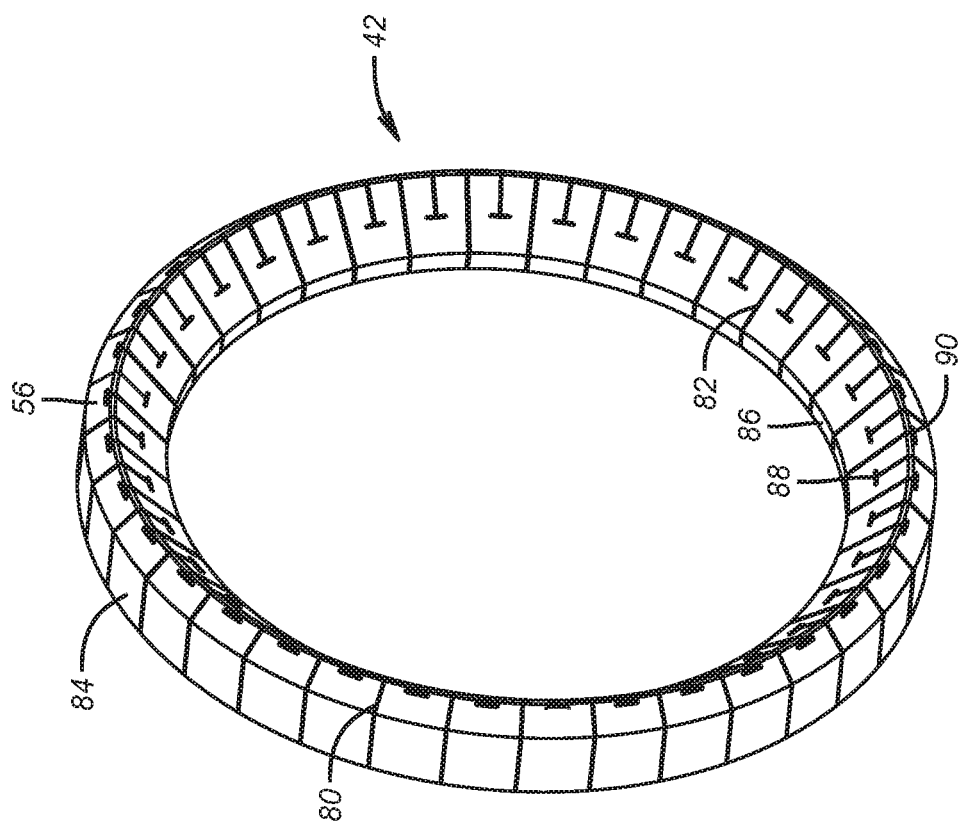
FIG. 6 is a perspective view of an optional anchoring ring shown in the run in condition.

FIGS. 4a and 4b show ring 34 in the run in and the set positions respectively. An outer face 60 continues along a tapered surface 62 to internal surface 64 seen as the inner parallel surface of a trapezoidal section in FIG. 3 and a continuous line in perspective in the views of FIG. 4. Slots 66 circumferentially alternate with slots 68 and are radially oriented to preferably align with the center of ring 34. Slots 66 start at the outer face 60 and slots 68 start at the surface 64. Slots 68 end in a transverse segment 70 and slots 66 end in a transverse segment 72. The transverse segments are there to limit stress as the slots 66 and 68 open up as the sealing element 20 is set against the borehole wall or tubular 54. Outer expandable ring 42 is shown in perspective in FIG. 6 and essentially has a similar slot configuration as described in FIGS. 4a and 4h with the section profile being different as shown in FIGS. 2 and 3. However it is the same continuous 360 degree design for the ring 42 as the ring 34 with alternating slots with transverse end portions that start from opposing ends of the ring structure. Specifically, slots 80 and 82 start respectively at outer face 84 and inner dimension 86 seen as a ring in FIG. 6 and as a flat in section in FIG. 2. The slots extend radially and preferably in alignment with the center of ring 42. Alternatively the slots can extend axially but radially is preferred. At the respective ends of slots 80 and 82 are transverse ends 88 and 90. As ring 42 expands from the FIG. 2 to the FIG. 3 position, the slots 80 and 82 open up to allow the diameter to increase until surface 56 hits surface 58 of inner expandable ring 34 as shown in FIG. 3.

Figure 7:
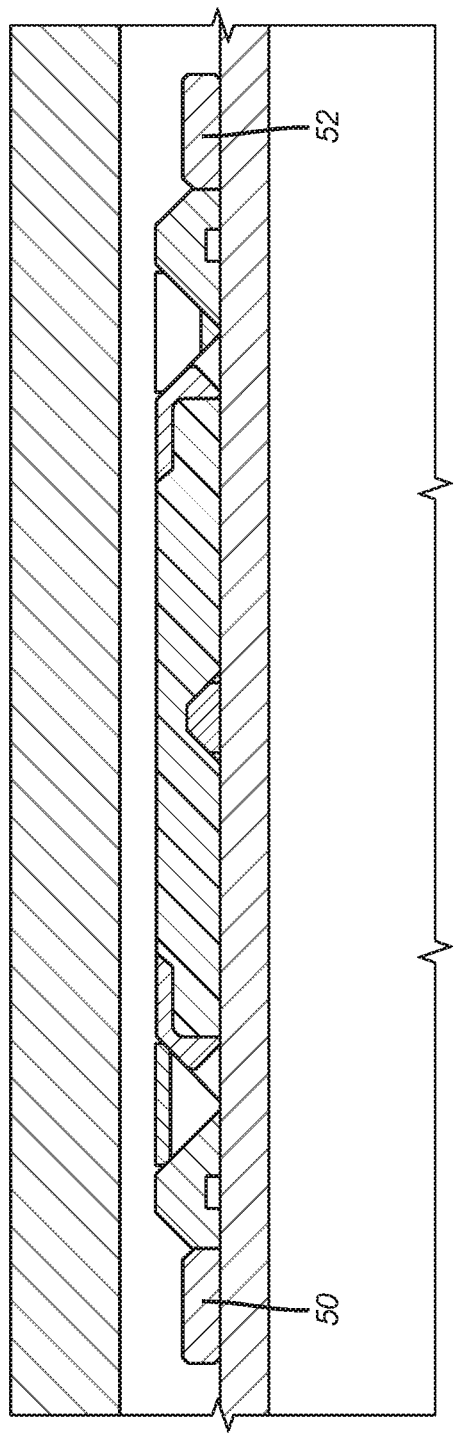
FIG. 7 is a section view of a short reach embodiment in the run in position.

Rings 34 and 40 can be Teflon, metallic, composite to name a few examples. The shape can be created with lasers or wire EDM fabrication methods. Although in FIGS. 2 and 3 a single inner ring 34 and outer ring 40 are illustrated multiple pairs of such rings that function in the same way can be used. In the case of FIGS. 7 and 8 multiple pairs of expandable ring 36 and ramp ring 38 can be used and they can operate in the same manner as illustrated for a single such pair of rings as shown in FIGS. 7 and 8. The 360 degree design for rings 34 and 42 combined with solid expandable ring 24, which prevents the rubber element 20 from escaping through cut slots in ring 34 and improves conformance to tubular or borehole inside diameter dramatically reduces extrusion of seal 20 even though the slots expand for the larger set position. The 360 degree feature of the rings 34, 42 and 24, if used, limit the extrusion gaps and allow a given sealing system 20 to be serviceable in higher pressure differential applications without extrusion risk. The design is modular so that it is simple to switch between the FIG. 2 and FIG. 7 configurations for different applications. The ring 42 backing up the ring 34 wedges ring 34 in the FIG. 3 set position wedges in ring 34 to hold it in position against high differential pressures that can exceed 10,000 PSI. The slot ends can be a transverse slot or an enlarged rounded end or other shape that limit stress concentration at the ends of the radial slots.

The above description is illustrative of the preferred embodiment and many modifications may be made by those skilled in the art without departing from the invention whose scope is to be determined from the literal and equivalent scope of the claims below:

We claim:

1. A expandable extrusion barrier ring assembly for a compression set sealing system for a borehole barrier, comprising:
 at least one single continuous 360 ring having an inner and outer face, the inner face having a first frustoconical surface and a second frustoconical surface, the first and second frustoconical surfaces being oriented oppositely to one another;
 a plurality of inner slots extending from said inner face alternating with a plurality of outer slots extending from said outer face;
 a transverse segment at a termination of an inner slot of the plurality of inner slots and/or an outer slot of the plurality of outer slots, the transverse segment reducing stress concentration at the termination during expansion of the barrier ring, the transverse segment at the end of the inner slot being positioned within one of the first and second frustoconical surfaces and radially outwardly of the other of the first and second frustoconical surfaces.

2. The assembly of claim 1, wherein:
said inner and outer slots are oriented radially or axially.

3. The assembly of claim 2, wherein:
said inner and outer slots align with a center of said ring.

4. The assembly of claim 1, wherein:
said inner and outer slots extend circumferentially for 360 degrees of said ring.

5. The assembly of claim 1, wherein:
said inner and outer slots extend radially partly through said ring.

6. The assembly of claim 1, wherein:
the transverse segment creates a T-shape with the inner or outer slot with which it is associated.

7. The assembly of claim 1, wherein:
said inner face of said ring contacting a mandrel on the barrier for run in and pushed radially away from contact with said mandrel and against a borehole wall or surrounding tubular in a set position.

8. The assembly of claim 7, wherein:
said ring abutting a ramp ring on said mandrel on one side and backup ring having a taper on an opposite side such that said ring moves away from said mandrel by virtue of said ramp ring and backup ring moving closer to each other.

9. The assembly of claim 8, wherein:
said ramp and backup rings have diverging tapers in a direction moving away from said mandrel such that said tapers radially wedge said ring against the borehole wall or surrounding tubular.

10. The assembly of claim 9, wherein:
said at least one ring comprises an inner expandable backup ring and an outer expandable backup ring separated by said ramp ring;
said outer expandable backup ring contacting said inner expandable backup ring as both rings move radially on opposed slopes of said ramp ring.

11. The assembly of claim 10, wherein:
said outer expandable backup ring is out of contact with the borehole wall or surrounding tubular when contacting said inner expandable backup ring.

12. The assembly of claim 11, wherein:
said ramp ring moves between said mandrel and said backup ring as said inner expandable backup ring comes in contact with the borehole wall or the surrounding tubular.

13. The assembly of claim 11, wherein:
said backup ring attached to a sealing element mounted to said mandrel;
said outer expandable backup ring positioned between diverging tapers on said ramp ring and a setting ring such that relative movement on said mandrel between said setting ring and said ramp ring pushes said outer expandable backup ring into said inner expandable backup ring.

14. The assembly of claim 9, wherein:
said backup ring attached to a sealing element mounted to said mandrel;
said inner expandable backup ring located between diverging tapers in a direction away from said mandrel on said ramp ring and said backup ring such that movement of said backup and ramp rings toward each other forces said inner expandable backup ring away from said mandrel and against the borehole wall or surrounding tubular.

15. The assembly of claim 14, wherein:
said at least one ring comprises an inner expandable backup ring and an outer expandable backup ring separated by a ramp ring;

said outer expandable backup ring contacting said inner expandable backup ring as both inner and outer expandable backup rings move radially on opposed slopes of said ramp ring.

16. The assembly of claim 15, wherein:
said inner and outer slots are oriented radially.

17. The assembly of claim 16, wherein:
said inner and outer slots align with a center of said inner and outer expandable backup rings.

18. The assembly of claim 15, wherein:
said inner and outer slots extend circumferentially for 360 degrees of said inner and outer expandable backup rings.

19. The assembly of claim 15, wherein:
said inner and outer slots extend radially partly through said inner and outer expandable backup rings.

20. The assembly of claim 9, wherein:
said at least one ring comprises two rings with one each on opposed sides of a sealing element for selective contact with a borehole wall or a surrounding tubular.

21. The assembly of claim 20, wherein:
said two rings comprise a mirror image arrangement on opposed sides of said sealing element along with said ramp and backup rings so that said two rings selectively contact a borehole wall or a surrounding tubular.

* * * * *